Patented Oct. 8, 1935

2,017,022

UNITED STATES PATENT OFFICE 2,017,022

CEMENTITIOUS MATERIAL

Carlisle K. Roos, Fort Dodge, Iowa, assignor to United States Gypsum Company, Chicago, Ill., a corporation of Illinois No Drawing. Application August 20, 1924, Serial No. 733,197

12 Claims. (Cl. 106—24)

This invention relates to building materials and more particularly to a light weight cementitious material of this character and the method for producing the same.

It is an object of this invention to combine with the cementitious material used for the finishing of walls, in the production of plaster wallboard, partition tile, roof tile, poured roof and floor constructions and other structural building units certain materials that will reduce the weight of such articles, will not shrink or fall when cast, and which will not materially reduce the hardness or strength of the material now employed for such purposes by expanding the cementitious material into cellular form while in the moist or wet state, thereby increasing its volume, and maintaining the same until hardened or set.

Ordinary hydrated gypsum plaster weighs from about 65 to 85 pounds per cubic foot. By the process developed here weights may be obtained in cast articles ranging from those mentioned above down to about 15 pounds per cubic foot. This is brought about by incorporating an aerated foam into the cementitious material, thereby imparting a cellular structure to the mass which forms a product of light weight. Such a foam may be obtained by the violent agitation of solutions of certain compounds which act as foaming reagents. This foam may be whipped into a fine grained form and to further stabilize it, it has been found desirable to stir into it a certain quantity of calcined gypsum. This addition was found to reinforce the walls of the bubbles to such an extent that the foam might be preserved indefinitely. Other addition reagents such as gelatin, dextrin and gum arabic have a similar foam preservative effect. This reinforced foam may be stirred into any mass of wet plaster or other cementitious material without destroying the character of the foam and thus a cellular structure is imparted to the wet mass.

The first step in carrying out this invention is the preparation of a solution capable of being converted into a foam by agitation. There are several types of reagents which will produce such a foaming solution or mixture such as solutions, mixtures, or emulsions of flotation oils, various organic compounds similar to soap, saponin, soap bark, gelatin, licorice, etc. The efficiency of the above mentioned reagents of course varies considerably and it has been found that a water solution containing up to three percent of powdered soap bark produces satisfactory results, however, it is not desired to limit the means of production or the reagents used in the production of this foam, as it may be desired to assist the formation of this foam by means of an addition of such reagents as calcium carbonate and aluminum sulphate to the foaming solution, which in their chemical reaction evolve a gas. Such a solution as of soap bark and water may be agitated or whipped into a foam in the same manner as eggs or cream. Immediately after the formation of satisfactory foam a relatively small quantity of calcined gypsum is added and stirred into it thoroughly. This reinforced foam is in a condition to be more readily assimilated by the main untreated cementitious mass to which it is subsequently added with sufficient agitation to obtain uniform distribution. The quantity of foam incorporated into the wet mass will of course determine its cellular structure, and this in turn determines the bulk and weight when dry.

A specific example of the process with approximate quantities of the materials used is as follows: One part of powdered soap bark is added to 160 parts of water and allowed to soak for a few minutes. This solution is vigorously agitated until the liquid is entirely beaten into a stiff foam. Two hundred parts of calcined gypsum are now added to the foam and stirred into it until its distribution is complete. This foam, when stirred into a mass of twelve hundred parts of calcined gypsum and the required amount of water to bring it to normal consistency, will effect a reduction in weight of the subsequently set or hardened mass of about 30%.

This process possesses the following advantages. The weight control is effected by the amount of foam which in turn is determined by the weight of soap bark. Installation, operation and reagent costs are small. Drying costs of the finished product are not increased. In this process the increase in water contents is very slight, and the porous nature of the product permits drying at a lower temperature and in a shorter time. The foam does not hinder or retard the setting of the calcined gypsum to any noticeable extent. An examination of the hardened mass shows a very uniformly fine cellular structure. The strength of the material is less than the normal value but is not reduced in proportion to its weight and still has hardness enough for many structural purposes. The plastic mixture produced by this process may be moulded and worked and cast in the same manner as the usual practice.

While ordinary hydrated gypsum has been used as a specific example of cementitious material in carrying out this invention, it is to be understood that other cementitious materials, such as, Portland cement, natural cements, oxichloride cements, and in fact any cementitious material capable of being molded or cast while in the plastic state, may be used as well and the resultant porous structure is just as pronounced irrespective of the nature of the cementitious material and its time of set. This is possible because the foaming agent can be so manipulated that foams of adequate permanence for greatly lengthened time of set in the cast articles can be provided.

What I claim is:

1. The process of producing a light weight building material which comprises incorporating in a mixture of calcined gypsum and water a stabilized foam and allowing the mixture to set.

2. The process of producing a light weight building material by incorporating in a mixture of cementitious material binding fiber and water, a preformed tenacious foam that imparts a cellular structure thereto to increase the volume of said mixture, and then removing the excess moisture, said foam maintaining the cellular structure in said mixture when hardened and dried.

3. The process of producing a light weight building material by forming a foam through beating air into a solution containing a foaming agent and incorporating the foam into a mixture of calcined gypsum and water by agitation and allowing the mass to set.

4. The process of forming a cellular cement which comprises forming a tenacious foam and mixing the foam with a cement.

5. The method of making a light weight building material that possesses a cellular structure which comprises making a tenacious foam and mixing the same with a substance capable of being hardened.

6. A plastic mass capable of being hardened into a light weight cellular building material comprising a mechanical mixture of a stable foam, a material capable of being hardened, and water.

7. A plastic mass capable of being hardened into a light weight cellular building material comprising a mechanical mixture of a stable foam, a cementitious setting material, and water.

8. A plastic mass capable of being hardened into a light weight cellular building material comprising a mechanical mixture of a stable foam, calcined gypsum, and water.

9. A light weight building material composed of a hard mass of cellular structure which comprises set cementitious material having permanently fixed therein foam cells that possess their original form and which are arranged throughout the structure in foam-like formation.

10. A structural building material comprising a mass of set cementitious material having foam-like arranged voids therein left by the drying of the bubbles of a stable foam which had been added to the cementitious material while the latter was in a plastic state.

11. A light weight cellular building material resulting from the setting and drying of a water-gauged composition comprising calcined gypsum and an aggregate composed of a stable foam.

12. A light weight cellular building material resulting from the hardening and drying of a plastic composition comprising a substance capable of hardening when dried and an aggregate composed of a stable foam.

CARLISLE K. ROOS.